US007019803B2

(12) United States Patent
Ashida et al.

(10) Patent No.: US 7,019,803 B2
(45) Date of Patent: Mar. 28, 2006

(54) COLOR LIQUID CRYSTAL DISPLAY PANEL

(75) Inventors: Takeyuki Ashida, Nara (JP); Kimitaka Nomura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 26 days.

(21) Appl. No.: 10/845,698

(22) Filed: May 14, 2004

(65) Prior Publication Data

US 2004/0227878 A1 Nov. 18, 2004

(30) Foreign Application Priority Data

May 14, 2003 (JP) ............................ 2003-135606

(51) Int. Cl.
*G02F 1/1333* (2006.01)

(52) U.S. Cl. ...................................... 349/114; 349/115

(58) Field of Classification Search ................ 349/114, 349/115

See application file for complete search history.

(56) References Cited

U.S. PATENT DOCUMENTS

2004/0008301 A1* 1/2004 Yoon .......................... 349/115

FOREIGN PATENT DOCUMENTS

JP 2000-321564 11/2000

* cited by examiner

*Primary Examiner*—James A. Dudek
(74) *Attorney, Agent, or Firm*—David G. Conlin; Peter J. Manus; Edwards Angell Palmer & Dodge LLP

(57) ABSTRACT

A color liquid crystal display panel includes: a first substrate provided on a light source side; a second substrate provided on a viewer side so as to oppose the first substrate; a liquid crystal layer provided between the first substrate and the second substrate; a color filter layer provided between the first substrate and the second substrate; a first transflective film provided closer to the light source than the liquid crystal layer and the color filter layer for reflecting ambient light coming from the viewer side while transmitting therethrough light-source light coming from the light source side; and a second transflective film provided closer to the viewer than the color filter layer for reflecting the ambient light while transmitting therethrough the light-source light.

14 Claims, 2 Drawing Sheets

COLOR LIQUID CRYSTAL DISPLAY PANEL

BACKGROUND OF THE INVENTION

1. Field of the Invention

The present invention relates to a color liquid crystal display panel that operates in a reflection mode and in a transmission mode.

2. Description of the Background Art

FIG. 4 and FIG. 5 are cross-sectional views schematically illustrating semi-transmissive color liquid crystal display devices of Conventional Examples 1 and 2, respectively, each of which operates in a reflection mode and in a transmission mode.

The process of manufacturing a liquid crystal display device of FIG. 4 will now be described. A color filter layer 3 is formed on a viewer-side glass substrate 2 and subjected to an overcoat process using a spin coating method, after which a sputtered transparent electrode 4 is patterned. An alignment film 5 is formed thereon using a roll coater method and subjected to a rubbing treatment.

An $SiO_2$ film and a thin aluminum film are sputtered on a light-source-side glass substrate 10, and a transflective film 9 (e.g., a reflective film having slits therein) is formed by photolithography. A transparent electrode 8 and an alignment film 7 are formed as described above, after which a rubbing treatment is performed. The substrate 2 and the substrate 10 are attached together so as to oppose each other, and a liquid crystal material is injected into the gap between the substrates 2 and 10 to form a liquid crystal layer 6. Then, polarizing plates 1 and 11 are provided on the viewer side of the substrate 2 and on the light source side of the substrate 10, respectively, and the light source 12 is provided, thus obtaining the liquid crystal display device as illustrated in FIG. 4.

The process of manufacturing a liquid crystal display device of FIG. 5 will now be described. A transparent conductive film is sputtered on a viewer-side glass substrate 2 and patterned into a transparent electrode 4 by photolithography. An alignment film 5 is formed thereon using a roll coater method and subjected to a rubbing treatment.

An $SiO_2$ film and a thin aluminum film are sputtered on a light-source-side glass substrate 10, and a transflective film 9 (e.g., a reflective film having slits therein) is formed by photolithography, on which a color filter layer 3 is formed. A transparent electrode 8 and an alignment film 7 are formed as described above, after which a rubbing treatment is performed. The substrate 2 and the substrate 10 are attached together so as to oppose each other, and a liquid crystal material is injected into the gap between the substrates 2 and 10 to form a liquid crystal layer 6. Then, polarizing plates 1 and 11 are provided on the viewer side of the substrate 2 and on the light source side of the substrate 10, respectively, and the light source 12 is provided, thus obtaining the liquid crystal display device as illustrated in FIG. 5.

The liquid crystal display devices of FIG. 4 and FIG. 5 use the transflective film 9 in order to realize both a reflection-mode display function using ambient light coming from the viewer side and a transmission-mode display function using light from the light source (hereinafter referred to as "light-source light"). The transflective film 9 may be a reflective film having slits therein or a half mirror.

The liquid crystal display devices of Conventional Examples 1 and 2 illustrated in FIG. 4 and FIG. 5 have the following problems. Light (reflected light) 16 used in the reflection mode is the ambient light coming from the viewer side, passing through the color filter layer 3, reflected by the transflective film 9 and passing again through the color filter layer 3 to exit the device toward the viewer. In contrast, light (transmitted light) 17 used in the transmission mode is the light from the light source 12, passing through the color filter layer 3 only once to exit the device toward the viewer. Therefore, the reflected light 16 passing through the color filter layer 3 of the same color twice and the transmitted light 17 passing therethrough only once will have significantly different saturations from each other. Moreover, in these liquid crystal display devices, the transmittance of the color filter layer 3 is set to be high, whereby colors are hardly recognized in the transmission mode.

Japanese Laid-Open Patent Publication No. 2000-321564 discloses a liquid crystal display device capable of eliminating the difference in saturation between the reflection mode and the transmission mode. The liquid crystal display device includes two color filter layers provided on opposite sides of the reflection plate. Therefore, the ambient light and the light-source light both pass through a color filter twice, whereby it is possible to display clear images without having a difference in saturation between the reflection mode and the transmission mode.

However, a photolithography process is employed in most cases in the color filter formation, and the photolithography process needs to be performed for each of color filter layers of different colors, i.e., red, green and blue. Therefore, the above liquid crystal display device requires a complicated manufacturing process and will be very expensive.

SUMMARY OF THE INVENTION

It is therefore an object of the present invention to provide a color liquid crystal display panel capable of operating both in a reflection mode and in a transmission mode and displaying images with a desirable saturation both in the reflection mode and in the transmission mode. Another object of the present invention is to realize such a color liquid crystal display panel with a relatively simple manufacturing process to suppress an increase in the cost thereof A color liquid crystal display panel according to a first aspect of the present invention includes: a first substrate provided on a light source side; a second substrate provided on a viewer side so as to oppose the first substrate; a liquid crystal layer provided between the first substrate and the second substrate; a color filter layer provided between the first substrate and the second substrate; a first transflective film provided closer to the light source than the liquid crystal layer and the color filter layer for reflecting ambient light coming from the viewer side while transmitting therethrough light-source light coming from the light source side; and a second transflective film provided closer to the viewer than the color filter layer for reflecting the ambient light while transmitting therethrough the light-source light. Thus, in a color liquid crystal display panel using a color filter layer and a first transflective film that functions to reflect the ambient light coming from the viewer side while transmitting therethrough light from the light source, a second transflective film is provided closer to the viewer than the color filter layer for adjusting the brightness and the chromaticity in the transmission mode and the reflection mode.

According to the present invention, transmitted light will have a level of saturation according to the performance of the color filter layer. Strictly speaking, a portion of the light-source light is reflected by the second transflective film, passes through the color filter layer, and is reflected by the first transflective film to pass again through the color filter layer and through the second transflective film. Therefore, the saturation of the transmitted light is slightly improved.

Reflected light exits the device as a combination of a non-colored light component and a colored light component. The non-colored component is a portion of the reflected light that is reflected by the second transflective film and thus does not pass through the color filter layer. The colored component is a portion of the reflected light that passes through the second transflective film and the color filter layer and is reflected by the first transflective film to pass again through the color filter layer and through the second transflective film. Therefore, the saturation of the reflected light will be low for the performance of the color filter layer, but the reflectance of the ambient light will be high. In other words, if the reflectance and the saturation of reflected light are set to similar levels to those of a conventional liquid crystal display panel, a color filter layer of a higher color purity can be employed, in which case the saturation of transmitted light will be significantly better.

Note that a portion of light having been reflected by the first transflective film and passed through the color filter layer is reflected by the second transflective film, passes again through the color filter layer, and is reflected again by the first transflective film to pass through the color filter layer, thereby increasing the saturation thereof.

In the color liquid crystal display panel according to the first aspect of the present invention, it is preferred that the color filter layer, the first transflective film and the second transflective film are provided closer to the light source than the liquid crystal layer, and are arranged in an order of the second transflective film, the color filter layer and the first transflective film from the liquid crystal layer side.

Thus, a desirable display can be realized without decreasing the optical characteristics such as the contrast as compared with those of a conventional liquid crystal display panel. Specifically, since the second transflective film is provided closer to the light source than the liquid crystal layer, light reflected by the first transflective film and light reflected by the second transflective film will pass through the liquid crystal layer, which gives an influence on the optical compensation, the same number of times, thereby causing no influence on the contrast. Typically, a polarizing plate giving an influence on the optical compensation is provided on the viewer side of the viewer-side substrate. Even then, the contrast will not be influenced because light reflected by the first transflective film and light reflected by the second transflective film pass through the viewer-side polarizing plate and the liquid crystal layer the same number of times.

A color liquid crystal display panel according to a second aspect of the present invention includes a color filter substrate, a counter substrate opposing the color filter substrate, and a liquid crystal layer interposed between the substrates. The color filter substrate includes a color filter layer, a first transflective film provided on one side of the color filter layer, and a second transflective film provided on the other side of the color filter layer. Typically, the second transflective film is provided closer to the liquid crystal layer than the first transflective film.

In the color liquid crystal display panels of the first and second aspects of the present invention, it is preferred that the second transflective film functions as an electrode for driving liquid crystal molecules in the liquid crystal layer. Thus, the liquid crystal display panels can be manufactured without adding a separate step of forming the second transflective film to the process of manufacturing a conventional liquid crystal display panel.

In the color liquid crystal display panels of the first and second aspects of the present invention, it is preferred that the second transflective film has a reflectance of 30% or less. A reflectance exceeding 30% may nullify the advantage of the provision of the second transflective film, i.e., the advantage that the brightness and the chromaticity in the transmission mode and the reflection mode can be adjusted.

A color liquid crystal display device according to the first aspect of the present invention includes the color liquid crystal display panel of the first aspect of the present invention, a pair of polarizing plates provided on a light source side of the first substrate and a viewer side of the second substrate, and a light source.

A color liquid crystal display device according to the second aspect of the present invention includes the color liquid crystal display panel of the second aspect of the present invention, a pair of polarizing plates provided on the color filter substrate and the counter substrate, and a light source.

DETAILED DESCRIPTION OF THE PREFERRED EMBODIMENTS

Preferred embodiments of the present invention will now be described with reference to the drawings. While the following embodiments are directed to a case where a passive (multiplex) driving method is employed as the liquid crystal driving method, the present invention may alternatively be applied to an active driving method using three-terminal elements such as TFTs (Thin Film Transistors) or two-terminal elements such as MIM (Metal Insulator Metal) elements.

Embodiment 1

Figure 1:
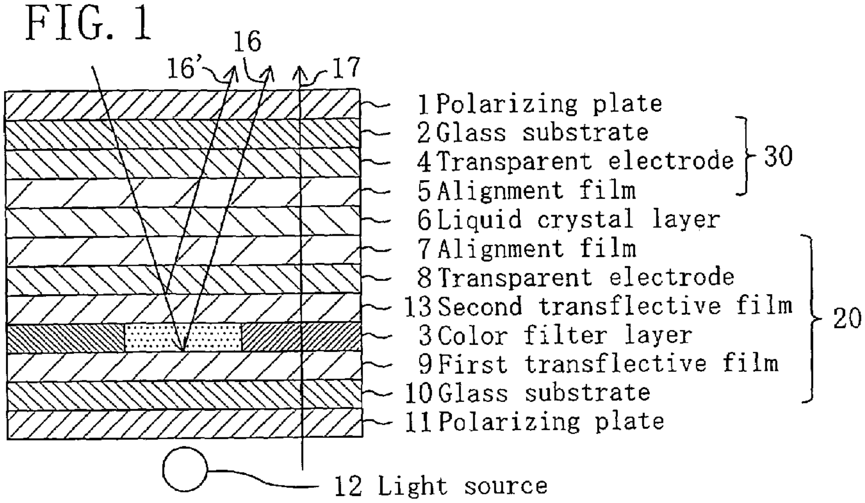
FIG. 1 is a cross-sectional view schematically illustrating a liquid crystal display device of Embodiment 1.

FIG. 1 is a cross-sectional view schematically illustrating a liquid crystal display device of Embodiment 1. The liquid crystal display device of the present embodiment includes a liquid crystal display panel, a light source 12, and a pair of polarizing plates 1 and 11 provided on opposite sides of the liquid crystal display panel. The liquid crystal display panel includes a light-source-side substrate (color filter substrate) 20 provided closer to the light source 12, a viewer-side substrate (counter substrate) 30 provided on the viewer side so as to oppose the light-source-side substrate 20, and a liquid crystal layer 6 between the substrate 20 and 30.

The light-source-side substrate 20 includes a first transflective film 9, a color filter layer 3, a second transflective film 13, a transparent electrode 8 and an alignment film 7 layered in this order on a glass substrate 10. The viewer-side substrate 30 includes a transparent electrode 4 and an alignment film 5 layered in this order on a glass substrate 2. The liquid crystal display panel of the present embodiment is driven by a passive driving method, and the transparent electrode 4 includes column electrodes arranged in a stripe pattern while the transparent electrode 8 includes row electrodes extending perpendicular to the column electrodes. Note that a transparent resin substrate may be used in place of each of the glass substrates 2 and 10.

The first transflective film 9 reflects the ambient light coming from the viewer side and transmits therethrough the light-source light coming from the light source side. The first transflective film 9 is formed from a metal film such as an aluminum film or a silver film, an interference-type reflective film (hereinafter referred to as an "interference film"), or the like. An interference film is made of a dielectric material such as $SiO_2$, and can be deposited using a vacuum deposition method, a sputtering method, or the like. The overall reflectance can be controlled by layering together a number of dielectric layers having different refractive indices and adjusting the reflection between the layers.

The reflectance of the first transflective film 9, which can appropriately be determined in view of the brightness and the chromaticity in the reflection mode and the transmission mode, is preferably 50% to 90%, and more preferably 60% to 80%.

Similar to the first transflective film 9, the second transflective film 13 reflects the ambient light coming from the viewer side and transmits therethrough the light-source light coming from the light source side. The second transflective film 13 may be a half mirror utilizing the reflection of a metal film such as an aluminum film or a silver film, or an interference film. The reflectance of the second transflective film 13, which can appropriately be determined in view of the brightness and the chromaticity in the reflection mode and the transmission mode, is preferably 30% or less, and more preferably 3% to 20%.

A method for measuring the reflectance of the transflective films 9 and 13 will now be described. The first transflective film 9 or the second transflective film 13 is deposited on a glass substrate using a sputtering apparatus, or the like. Then, the reflectance of the deposited transflective film is measured using a spectrocolorimeter (e.g., CM-2002 from Konica Minolta Holdings, Inc.) under diffused lighting. Diffused lighting is obtained by illuminating a sample equally from every direction by using an integrating sphere, or the like. An integrating sphere is a spherical color-measuring apparatus whose inner surface is coated with a white paint such as barium sulfate so as to give substantially completely diffuse reflection to incident light. A white board is used as a reference whose measured reflectance is taken to be 100%.

In the liquid crystal display device of the present embodiment, the ambient light enters the device from the viewer side and exits the device toward the viewer as a combination of a component 16 reflected by the first transflective film 9 and another component 16' reflected by the second transflective film 13. Thus, the output light in the reflection mode is a combination of the component 16 reflected by the first transflective film 9 and the component 16' reflected by the second transflective film 13. The components 16 and 16' are subject to substantially the same optical compensation effect as they pass through a polarizing plate 1, the liquid crystal layer 6, etc. However, while the component 16 passes through the color filter layer 3 twice, the component 16' does not pass through the color filter layer 3 and is thus not colored (no light absorption), i.e., white. Therefore, the combination of the component 16 and the component 16' will be brighter, less saturated light as compared with the conventional examples using the same color filter layer 3.

The light-source light coming from the light source 12 passes successively through the first transflective film 9, the color filter layer 3 and the second transflective film 13, and then exits the device toward the viewer. Note however that a portion of the light having passed through the first transflective film 9 and the color filter layer 3 is reflected by the second transflective film 13, whereby it passes again through the color filter layer 3 and is reflected by the first transflective film 9. A portion of the light having been reflected by the first transflective film 9 passes through the color filter layer 3 and the second transflective film 13 to exit the device toward the viewer. Therefore, transmitted light 17 contains a component that passes through the color filter layer 3 three times and has an increased saturation. Thus, the transmitted light 17 will be more saturated light than the conventional examples. Note that a portion of the light having been reflected by the first transflective film 9 is reflected by the second transflective film 13 to be further saturated.

Therefore, the present invention can advantageously be applied to a conventional color liquid crystal display panel, which can achieve only a low saturation in the transmission mode although it achieves a high saturation in the reflection mode. Then, the difference in saturation between the reflection mode and the transmission mode can be reduced. By appropriately adjusting the reflectance balance between the first transflective film 9 and the second transflective film 13, it is possible to freely set the brightness and the chromaticity in the reflection mode and those in the transmission mode.

The brightness in the reflection mode and the saturation in the transmission mode are important from a practical point of view. The liquid crystal display device of the present embodiment can employ the color filter layer 3 with an improved color purity (saturation) as compared with the color filter of a conventional semi-transmissive color liquid crystal display device. Therefore, it is possible to improve the saturation in the transmission mode as compared with a conventional semi-transmissive color liquid crystal display device.

The process of manufacturing the color liquid crystal display device of the present embodiment will now be described. A transparent conductive film is formed on the viewer-side glass substrate 2 by sputtering ITO (Indium Tin Oxide), or the like, and then patterned by photolithography into the transparent electrode 4. The alignment film 5 is formed thereon by a roll coater method and subjected to a rubbing treatment to obtain the viewer-side substrate 30.

Next, a metal film such as an aluminum film or a silver film is deposited by vapor deposition on the light-source-side glass substrate 10 to form the first transflective film 9. The color filter layer 3 is formed thereon and further subjected to an overcoat process. The second transflective film 13 is formed on the overcoat film (not shown). The second transflective film 13 is obtained by forming a half mirror from a metal film or an interference-type reflective film using an appropriate method such as a vapor deposition method or a coating method.

As with the viewer-side substrate 30, the transparent electrode 8 and the alignment film 7 are formed on the second transflective film 13, after which a rubbing treatment is performed. Note that in a case where the second transflective film 13 is made of a conductor such as a metal, the second transflective film 13 needs to be shielded with an insulator in order to prevent current leakage from the transparent electrode 8 to the second transflective film 13.

The light-source-side substrate 20 and the viewer-side substrate 30 are attached together so as to oppose each other, and a liquid crystal material is injected into the gap between the substrates 20 and 30 to form the liquid crystal layer 6. Thus, a color liquid crystal display panel is obtained. Phase plates (not shown) having a predetermined phase difference and the polarizing plates 1 and 11 having predetermined optical axes are attached to the light source side of the light-source-side substrate 20 and the viewer side of the viewer-side substrate 30, and then the light source 12 is provided to obtain the color liquid crystal display device of the present embodiment.

Embodiment 2

Figure 2:
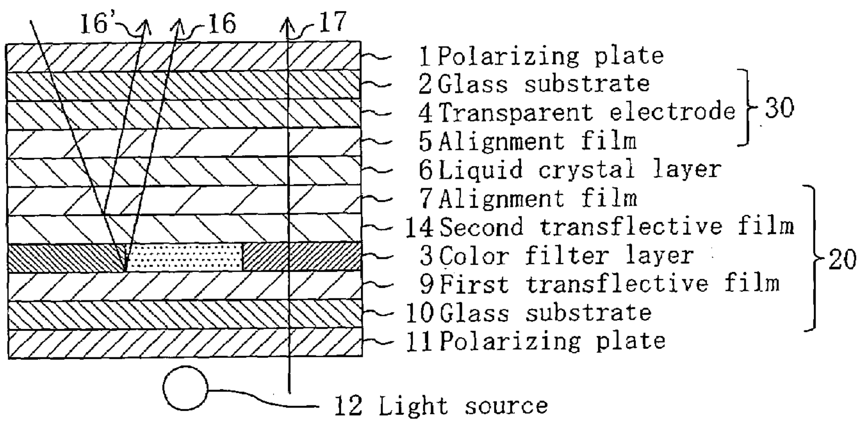
FIG. 2 is a cross-sectional view schematically illustrating a liquid crystal display device of Embodiment 2.

FIG. 2 is a cross-sectional view schematically illustrating a liquid crystal display device of Embodiment 2. In this and subsequent figures, elements having substantially the same functions as those of the liquid crystal display device of Embodiment 1 will be denoted by the same reference numerals, and will not be further described below.

The liquid crystal display device of the present embodiment does not include the transparent electrode 8 used in Embodiment 1, but a second transflective film 14 functions as an electrode for driving the liquid crystal molecules in the liquid crystal layer 6. In other words, the second transflective film 14 is an electrode with a transflective function. The second transflective film 14 is formed from a conductive film such as a metal film, and the thickness thereof is adjusted so as to be transflective.

According to the present embodiment, an electrode is formed in the formation of the second transflective film, whereby it is not necessary to form the electrode in a separate step. Moreover, it is not necessary to form an insulating film for insulating the second transflective film and the electrode from each other. Therefore, the liquid crystal display panel can be manufactured by a similar manufacturing process for a conventional liquid crystal display panel, whereby it is possible to suppress the increase in the manufacturing cost.

Embodiment 3

Figure 3:
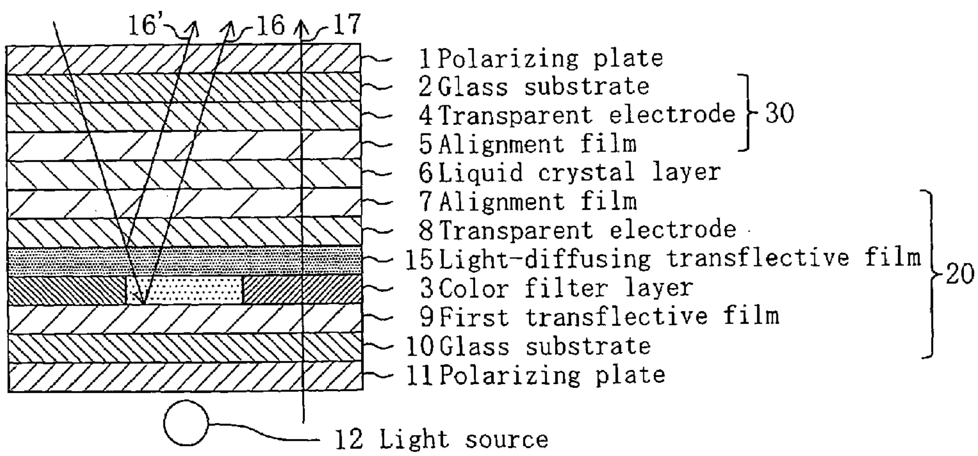
FIG. 3 is a cross-sectional view schematically illustrating a liquid crystal display device of Embodiment 3.
Figure 4:
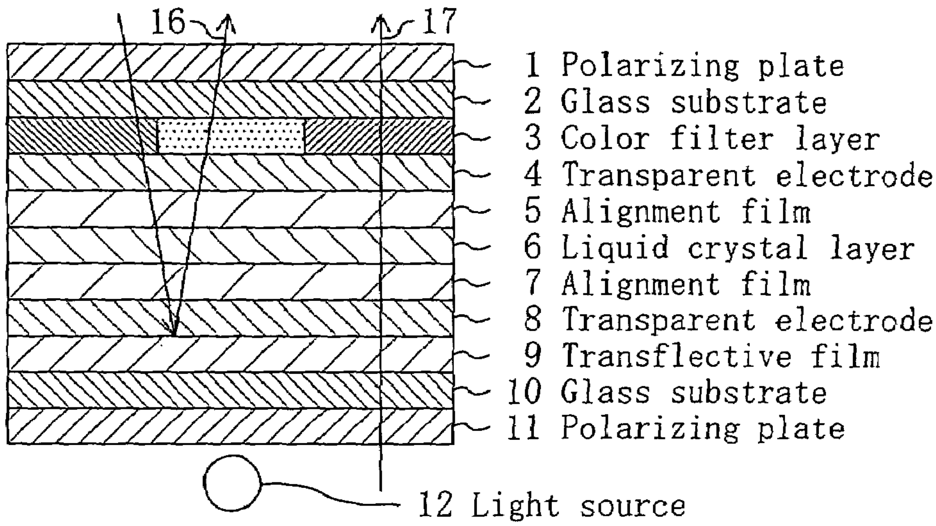
FIG. 4 is a cross-sectional view schematically illustrating a semi-transmissive color liquid crystal display device of Conventional Example 1.
Figure 5:
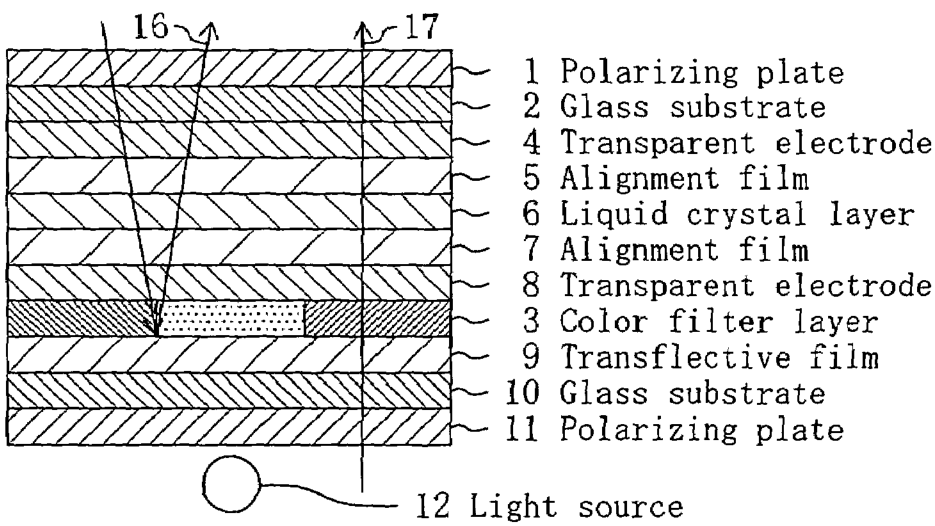
FIG. 5 is a cross-sectional view schematically illustrating a semi-transmissive color liquid crystal display device of Conventional Example 2.

FIG. 3 is a cross-sectional view schematically illustrating a liquid crystal display device of Embodiment 3. In the liquid crystal display device of the present embodiment, the second transflective film is a light-diffusing transflective film 15 that is not only transflective but is also light diffusing.

The light-diffusing transflective film 15 is, for example, a layered structure of a transparent resin film having surface irregularities and a transflective film formed on the transparent resin film. Specifically, an acrylic resin film is formed and subjected to a heat treatment, whereby the surface thereof is deformed into surface irregularities. A transflective film is formed by a sputtering method, or the like, on the irregular surface to obtain a light-diffusing transflective film. The reflectance thereof can be controlled by adjusting the thickness of the transflective film.

According to the present embodiment, in a case where the first transflective film 9 has a mirror surface, it is not necessary to separately provide a light diffusing layer, whereby it is possible to suppress the increase in the manufacturing cost and to realize a less expensive device.

Note that the first transflective film 9 can be provided with a light-diffusing property instead of, or in addition to, the light-diffusing transflective film 15. Alternatively, the transflective film may be formed as a mirror-surface film, while forming a light-diffusing layer separately. In such a case, the light-diffusing layer can be formed by, for example, dispersing transparent particles in the transparent resin layer.

ALTERNATIVE EMBODIMENTS

In Embodiments 1 to 3, the second transflective film 13, 14 or 15 is provided on the light-source-side substrate 20. However, the arrangement of the second transflective film 13, 14 or 15 is not limited to this, and they may be provided at any position between the color filter layer 3 and the polarizing plate 1. For example, the second transflective film 13, 14 or 15 may be provided on the viewer-side substrate 30, or between the glass substrate 2 and the polarizing plate 1. Note however that the second transflective film 13, 14 or 15 is preferably provided on the light-source-side substrate 20. When the second transflective film 13, 14 or 15 is provided on the viewer-side substrate 30, the liquid crystal layer 6 will be present between the first transflective film 9 and the second transflective film 13, 14 or 15, whereby the optical compensation for light reflected by the second transflective film 13, 14 or 15 may be different from that for light reflected by the first transflective film 9, thus decreasing the contrast.

In Embodiments 1 to 3, the color filter layer 3 is provided on the light-source-side substrate 20. Alternatively, the color filter layer 3 may be provided on the viewer-side substrate 30. In such a case, the second transflective film 13, 14 or 15 is also provided on the viewer-side substrate 30. The first transflective film 9 may be provided at any position between the liquid crystal layer 6 and the polarizing plate 1. For example, the first transflective film 9 may be provided between the glass substrate 10 and the polarizing plate 11.

However, it is preferred that the color filter layer 3 and the transflective film 9, 13, 14 or 15 are as close to each other as possible. For example, if the color filter layer 3 and the first transflective film 9 are distant from each other, color mixing may occur. Specifically, light having been colored in red through the color filter layer 3 may pass through a green portion of the color filter layer 3 while traveling toward the viewer after being reflected by the first transflective film 9. Then, the color of the output light will be a mixture of red and green, resulting in dark light. Moreover, if the color filter layer 3 and the second transflective film 13, 14 or 15 are so distant from each other that the liquid crystal layer 6 is present therebetween, the optical compensation for light reflected by the second transflective film 13, 14 or 15 may be different from that for light reflected by the first transflective film 9, thus decreasing the contrast.

The color filter layer 3 may include a colorless transparent region having a slit-like or circular pattern. The area proportion of the colorless transparent region may differ between portions of the color filter layer 3 of different hues. For example, the area of the colorless transparent region in the blue portion of the color filter layer 3 may be greater than that in the red or green portion of the color filter layer 3.

Now, the display characteristics of the liquid crystal display device of Embodiment 2 will be described below in comparison with a reference example. The second transflective film 14 of Embodiment 2 is an aluminum vapor-deposition film, and the thickness thereof is adjusted so that the reflectance will be 6%. The color filter layer 3 has Y (brightness)=43, and the first transflective film 9 has a reflectance-transmittance ratio of 70:30.

The reference example is similar to Conventional Example 2 above, except that the second transflective film 14 is replaced with an ITO vapor-deposition film. The color filter layer 3 of the reference example has Y (brightness)=60. Note that the saturation in the reflection mode and the saturation in the transmission mode will be referred to as the "reflection-mode saturation" and the "transmission-mode saturation", respectively. Each of the reflection-mode saturation and the transmission-mode saturation can be calculated based on the area of a triangle that is defined by the R, G and B chromaticity points (represented by coordinates x and y) in the XYZ colorimetric system. The saturation can be measured using a chromaticity/brightness meter.

In the liquid crystal display device of Embodiment 2, the transmission-mode saturation is considerably improved from that of the reference example while maintaining a similar level of reflection-mode saturation to that of the reference example. Thus, with the provision of the second transflective film 14, it is possible to significantly improve the transmission-mode saturation while maintaining a similar level of reflection-mode saturation to that of a conventional liquid crystal display device. The balance between the reflection-mode saturation and the transmission-mode saturation can be adjusted by appropriately determining the reflectance of the second transflective film 14. Therefore, the saturation balance can easily be changed in response to a user's demand. Note that the liquid crystal display device of Embodiment 2 has a similar level of contrast to that of the reference example both in the reflection mode and in the transmission mode.

The color liquid crystal display panel of the present invention can display images with a desirable saturation both in the reflection mode and in the transmission mode. Moreover, the color liquid crystal display panel can be manufactured by a relatively simple process, whereby it is possible to suppress the increase in the manufacturing cost.

While the present invention has been described in particular embodiments, the technical scope thereof is not limited to that of the description of the embodiments above. It will be understood by those skilled in the art that the embodiments above are merely illustrative and various modifications can be made thereto by modifying the components thereof in various ways, and that such modifications shall fall within the technical scope of the invention.

This Nonprovisional application claims priority under 35 U.S.C. §119 (a) on Patent Application No. 2003-135606 filed in Japan on May 14, 2003, the entire contents of which are hereby incorporated by reference.

What is claimed is:

1. A color liquid crystal display panel, comprising:

a first substrate provided on a light source side;

a second substrate provided on a viewer side so as to oppose the first substrate;

a liquid crystal layer provided between the first substrate and the second substrate;

a color filter layer provided between the first substrate and the second substrate;

a first transflective film provided closer to the light source than the liquid crystal layer and the color filter layer for reflecting ambient light coming from the viewer side while transmitting therethrough light-source light coming from the light source side; and a second transflective film provided closer to the viewer than the color filter layer for reflecting the ambient light while transmitting therethrough the light-source light, wherein the color liquid crystal display panel operates both in a reflection mode and in a transmission mode with the first and second transflective films.

2. The color liquid crystal display panel of claim 1, wherein the color filter layer, the first transflective film and the second transflective film are provided closer to the light source than the liquid crystal layer, and are arranged in an order of the second transflective film, the color filter layer and the first transflective film from the liquid crystal layer side.

3. A color liquid crystal display panel comprising:

a first substrate provided on a light source side;

a second substrate provided on a viewer side so as to oppose the first substrate;

a liquid crystal layer provided between the first substrate and the second substrate;

a color filter layer provided between the first substrate and the second substrate;

a first transflective film provided closer to the light source than the liquid crystal layer and the color filter layer for reflecting ambient light coming from the viewer side while transmitting therethrough light-source light coming from the light source side; and a second transflective film provided closer to the viewer than the color filter layer for reflecting the ambient light while transmitting therethrough the light-source light, wherein the color filter layer, the first transflective film and the second transflective film are provided closer to the light source than the liquid crystal layer, and are arranged in an order of the second transflective film, the color filter layer and the first transflective film from the liquid crystal layer side, and wherein the second transflective film functions as an electrode for driving liquid crystal molecules in the liquid crystal layer.

4. The color liquid crystal display panel of claim 2, wherein the second transflective film has a reflectance of about 30% or less.

5. A color liquid crystal display panel comprising:

a first substrate provided on a light source side;

a second substrate provided on a viewer side so as to oppose the first substrate;

a liquid crystal layer provided between the first substrate and the second substrate;

a color filter layer provided between the first substrate and the second substrate;

a first transflective film provided closer to the light source than the liquid crystal layer and the color filter layer for reflecting ambient light coming from the viewer side while transmitting therethrough light-source light coming from the light source side; and a second transflective film provided closer to the viewer than the color filter layer for reflecting the ambient light while transmitting therethrough the light-source light, wherein the color filter layer, the first transflective film and the second transtiective film are provided closer to the light source than the liquid crystal layer, and are arranged in an order of the second transflective film, the color filter layer and the first transflective film from the liquid crystal layer side, and wherein the second transflective film has a reflectance of about 3% to about 20%.

6. The color liquid crystal display panel of claim 2, wherein the first transflective film has a reflectance of about 50% to about 90%.

7. The color liquid crystal display panel of claim 2, wherein the first transflective film has a reflectance of about 60% to about 80%.

8. A color liquid crystal display device, comprising the color liquid crystal display panel of claim 1, a pair of polarizing plates provided on a light source side of the first substrate and a viewer side of the second substrate, and a light source.

9. A color filter substrate which is used for a color liquid crystal display panel operating in a reflection mode and in a transmission mode, the color filter substrate comprising a color filter layer, a first transflective film provided on one side of the color filter layer, and a second transflective film provided on the other side of the color filter layer.

10. A color liquid crystal display panel, comprising the color filter substrate of claim 9, a counter substrate opposing the color filter substrate, and a liquid crystal layer interposed between the substrates.

11. The color liquid crystal display panel of claim 10, wherein the second transflective film is provided closer to the liquid crystal layer than the first transflective film and functions as an electrode for driving liquid crystal molecules in the liquid crystal layer.

12. The color liquid crystal display panel of claim 11, wherein the second transflective film has a reflectance of about 30% or less.

13. The color liquid crystal display panel of claim 11, wherein the first transflective film has a reflectance of about 50% to about 90%.

14. A color liquid crystal display device, comprising the color liquid crystal display panel of claim 10, a pair of polarizing plates provided on the color filter substrate and the counter substrate, and a light source.

* * * * *